US012752994B2

(12) United States Patent
Polk, Jr. et al.

(10) Patent No.: US 12,752,994 B2
(45) Date of Patent: Oct. 6, 2026

(54) STORED VALUE CARD AND CARRIER SYSTEM AND METHOD OF MANUFACTURING

(71) Applicant: Stored Value Solutions, Inc., Louisville, KY (US)

(72) Inventors: James W. Polk, Jr., Louisville, KY (US); Dustin B. Szwed, Louisville, KY (US)

(73) Assignee: Stored Value Solutions, Inc., Louisville, KY (US)

(*) Notice: Subject to any disclaimer, the term of this patent is extended or adjusted under 35 U.S.C. 154(b) by 1 day.

(21) Appl. No.: 18/609,060

(22) Filed: Mar. 19, 2024

(65) Prior Publication Data

US 2025/0296752 A1 Sep. 25, 2025

(51) Int. Cl.

| | |
|---|---|
| ***B65D 73/00*** | (2006.01) |
| ***B65B 5/02*** | (2006.01) |
| ***B65B 5/04*** | (2006.01) |
| ***B65D 77/30*** | (2006.01) |
| ***G06K 19/06*** | (2006.01) |

(52) U.S. Cl.

CPC .......... *B65D 73/0078* (2013.01); *B65B 5/024* (2013.01); *B65B 5/04* (2013.01); *B65D 77/30* (2013.01); *G06K 19/06028* (2013.01)

(58) Field of Classification Search

CPC ........................ B65D 2203/06; B65D 73/0078; B65D 77/30; B65B 5/04; B65B 5/024; G06K 19/06028

USPC .......................... 206/449, 307; 235/380, 486

See application file for complete search history.

(56) References Cited

U.S. PATENT DOCUMENTS

| | | | |
|---|---|---|---|
| 4,544,184 | A | 10/1985 | Freund et al. |
| 5,489,123 | A | 2/1996 | Roshkoff |
| 5,609,253 | A | 3/1997 | Goade, Sr. |
| 6,109,439 | A | 8/2000 | Goade, Sr. |
| 6,315,206 | B1 | 11/2001 | Hansen et al. |
| 6,619,480 | B2 | 9/2003 | Smith |
| 6,698,116 | B2 | 3/2004 | Waldron |
| 6,957,737 | B1 | 10/2005 | Frederickson et al. |

(Continued)

FOREIGN PATENT DOCUMENTS

| | | | |
|---|---|---|---|
| EP | 1136930 | A1 | 9/2001 |
| EP | 2226266 | A1 | 9/2010 |

OTHER PUBLICATIONS

European Patent Office Search Report for corresponding patent application 25163895.3, dated Aug. 4, 2025, 8 pages.

*Primary Examiner* — Chun Hoi Cheung

(74) *Attorney, Agent, or Firm* — Patterson Intellectual Property Law, PC

(57) ABSTRACT

A stored value card and carrier system comprising a carrier and a stored value card. The carrier including first and second panels. The first and second panels may be coupled together to define a chamber therein having four sides. The chamber may be sealed on each of the four sides such that egress to an interior of the chamber is substantially prevented. The stored value card may have activation indicia displayed thereon. The stored value card may have activation indicia displayed thereon. The stored value card may be situated within the chamber and adhered to at least one inner surface of the chamber. Accessing of the activation indicia of the stored value card may necessarily correspond with destruction of at least one of the first and second panels.

18 Claims, 8 Drawing Sheets

(56) References Cited

U.S. PATENT DOCUMENTS

| | | | | |
|---|---|---|---|---|
| 7,011,249 | B2 * | 3/2006 | Tang | G09F 1/04 235/486 |
| 7,040,049 | B2 | 5/2006 | Cox et al. | |
| 7,219,835 | B2 | 5/2007 | Graves et al. | |
| 7,370,805 | B2 | 5/2008 | Smith et al. | |
| 7,584,887 | B1 * | 9/2009 | Sanchez | H04M 17/02 235/448 |
| 7,607,574 | B2 * | 10/2009 | Kingsborough | G06K 19/06187 235/375 |
| 7,607,575 | B2 | 10/2009 | Kingsborough et al. | |
| 8,091,781 | B2 | 1/2012 | Albrecht et al. | |
| 8,397,407 | B2 | 3/2013 | Lauer et al. | |
| 8,523,078 | B2 | 9/2013 | Biskupski | |
| 8,915,366 | B2 * | 12/2014 | Smith | B65D 75/566 283/61 |
| 9,053,470 | B2 | 6/2015 | Boge et al. | |
| 9,117,237 | B2 | 8/2015 | Levitt et al. | |
| 9,754,252 | B2 | 9/2017 | Pinski | |
| 9,852,414 | B2 | 12/2017 | Llach | |
| 10,275,698 | B2 * | 4/2019 | Pascua | G06K 19/18 |
| 10,373,040 | B2 | 8/2019 | Tomczyk | |
| 10,565,486 | B2 * | 2/2020 | Pascua | B32B 29/002 |
| 10,963,767 | B2 * | 3/2021 | Pascua | G06K 19/18 |
| 11,170,669 | B2 | 11/2021 | Pascua et al. | |
| 2002/0088855 | A1 | 7/2002 | Hodes | |
| 2003/0004889 | A1 | 1/2003 | Fiala et al. | |
| 2005/0017502 | A1 | 1/2005 | Chariker | |
| 2005/0279825 | A1 | 12/2005 | Ashby et al. | |
| 2006/0144926 | A1 | 7/2006 | Jacobs | |
| 2006/0249570 | A1 | 11/2006 | Seifert et al. | |
| 2008/0217415 | A1 | 9/2008 | Royer | |
| 2010/0213092 | A1 * | 8/2010 | Swain | B65D 75/20 206/460 |
| 2010/0219099 | A1 | 9/2010 | Schmitt et al. | |
| 2012/0018501 | A1 | 1/2012 | Wilen | |
| 2012/0145578 | A1 * | 6/2012 | Pazlar | B65D 73/0078 235/487 |
| 2013/0013437 | A1 | 1/2013 | Singh et al. | |
| 2013/0304642 | A1 | 11/2013 | Campos | |
| 2014/0131433 | A1 | 5/2014 | Serhal | |
| 2014/0143089 | A1 | 5/2014 | Campos et al. | |
| 2015/0371247 | A1 | 12/2015 | Kruglick | |
| 2016/0174457 | A1 | 6/2016 | Lynch | |
| 2017/0032382 | A1 | 2/2017 | Shulman et al. | |
| 2017/0243098 | A1 | 8/2017 | Pascua et al. | |
| 2018/0079248 | A1 | 3/2018 | Pascua et al. | |
| 2022/0055814 | A1 | 2/2022 | Boge et al. | |
| 2022/0339955 | A1 * | 10/2022 | Dickman | B42D 15/045 |

* cited by examiner

STORED VALUE CARD AND CARRIER SYSTEM AND METHOD OF MANUFACTURING

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

1. Field of the Invention

The present invention relates generally to stored value cards. More particularly, the present invention relates to a stored value card and carrier system and a method of manufacturing the stored value card and carrier system wherein accessing of the activation indicia of the stored value card necessarily corresponds with destruction of at least a portion of the carrier.

2. Description of the Prior Art

Stored value cards, also referred to as pre-paid cards or gift cards, are generally known in the prior art and are used by consumers to perform financial transactions. Unlike a debit card, the monetary value is typically stored on the card itself rather than in a financial institution account.

Historically, stored value cards have been adhered to various forms of a carrier or other packaging to present the card for sale to consumers. A consumer may select a stored value card from a store display and present the card along with the carrier to a cashier. The cashier may utilize activation indicia displayed on the stored value card to activate (i.e., add value to) the card. The cashier may scan the activation indicia (e.g., where the activation indicia is a barcode), swipe the activation indicia (e.g., where the activation indicia is a magnetic strip), input the activation indicia into a check-out system (e.g., where the activation indicia is a unique code), or the like.

Fraudsters have developed processes and schemes to compromise the stored value cards. Merchants have attempted to prevent such fraud by securing the carrier around the card, thus creating an external carrier with security features and an internal security feature free area where the stored value card is located. However, these fraudsters penetrate the outside security of the carrier and reach the security feature free area where the store value card is located. Once the fraudster has reached this security feature free area, they remove the card, capture information, or manipulate the card, and return the card to the carrier. The compromised stored value card is then sold to an unsuspecting consumer who becomes the victim of the fraud through the loss of funds on the card.

Accordingly, a need exists for improvements in stored value card and carrier systems wherein removing the stored value card from the carrier destroys the carrier and thus provides a visual clue that the carrier has been tampered with prior to purchase.

BRIEF SUMMARY

This Summary of the Disclosure is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect in accordance with the present disclosure is a stored value card and carrier system comprising a carrier and a stored value card. The carrier may include first and second panels. The first and second panels may be coupled together to define a chamber therein having four sides. The chamber may be sealed on each of the four sides, such that egress to an interior of the chamber is substantially prevented. The stored value card may have activation indicia displayed thereon. The stored value card may be situated within the chamber and adhered to at least one inner surface of the chamber. Accessing the activation indicia of the stored value card may necessarily correspond with destruction of at least one of the first and second panels.

In accordance with other aspects of the present disclosure, a first side of the stored value card may be adhered to a first inner surface of the chamber and a second side of the stored value card may be adhered to a second inner surface of the chamber.

In accordance with other aspects of the present disclosure, the activation indicia is displayed on a first side of the stored value card and the first side of the stored value card is adhered to the at least one inner surface of the chamber.

In accordance with other aspects of the present disclosure, the activation indicia may be displayed on a first side of the stored value card and a second side of the stored value card may be adhered to the at least one inner surface of the chamber. The second side of the stored value card may be opposite the first side.

In accordance with other aspects of the present disclosure, the carrier may include a removable pull-tab defined in either the first or second panel. The removable pull-tab may be at least partially covering the activation indicia of the stored value card. The stored value card may be adhered to the removable pull-tab.

In accordance with other aspects of the present disclosure, at least portions of the stored value card surrounding the activation indicia may be adhered to the removable pull-tab.

In accordance with other aspects of the present disclosure, the removable pull-tab may include first and second perforated edges coupling the removable pull-tab to the remaining portions of the either first or second panel. Accessing of the activation indicia of the stored value card may necessarily correspond with destruction of at least the removable pull-tab.

In accordance with other aspects of the present disclosure, the stored value card and carrier system may further comprise a label adhered to the stored value card at least partially covering the activation indicia. A side of the stored value card displaying the activation indicia may be adhered to the at least one inner surface of the chamber.

In accordance with other aspects of the present disclosure, the stored value card and carrier system may further comprise a label adhered to the stored value card at least partially covering the activation indicia. A first side of the stored value card may be adhered to a first inner surface of the chamber and a second side of the stored value card may be adhered to a second inner surface of the chamber.

In accordance with other aspects of the present disclosure, at least one of the first and second panels may include a plurality of slits. The plurality of slits may be located adjacent to at least a portion of the four sides of the chamber.

Another aspect in accordance with the present disclosure is a method of manufacturing a stored value card and carrier system comprising situating a stored value card having activation indicia between first and second panels of a carrier, adhering the stored value card to at least one inner surface of the first and second panels, and coupling the first and second panels together to define a chamber having four sides. The chamber may be sealed on each of the four sides such that egress to an interior of the chamber is substantially prevented. When the stored value card is situated within the chamber, accessing of the activation indicia of the stored value card may necessarily correspond with destruction of at least one of the first and second panels.

In accordance with other aspects of the present disclosure, adhering the stored value card to at least one inner surface of the first and second panels may include adhering a first side of the stored value card to an inner surface of the first panel and a second side of the stored value card to an inner surface of the second panel.

In accordance with other aspects of the present disclosure, the activation indicia may be displayed on a first side of the stored value card and adhering the stored value card to at least one inner surface of the first and second panels may include adhering the first side of the stored value card to at least one inner surface of the first and second panels.

In accordance with other aspects of the present disclosure, the activation indicia may be displayed on a first side of the stored value card and adhering the stored value card to at least one inner surface of the first and second panels may include adhering a second side of the stored value card to at least one inner surface of the first and second panels. The second side of the stored value card may be opposite the first side.

In accordance with other aspects of the present disclosure, the method of manufacture further comprises defining a removable pull-tab in either the first or second panel and adhering the stored value card to the removable pull-tab. The removable pull-tab may at least partially cover the activation indicia of the stored value card.

In accordance with other aspects of the present disclosure, adhering the stored value card to the removable pull-tab may include adhering at least a portion of the stored value card surrounding the activation indicia to the removable pull-tab.

In accordance with other aspects of the present disclosure, the removable pull-tab may include first and second perforated edges coupling the removable pull-tab to the remaining portions of the either first or second panel. Accessing of the activation indicia of the stored value card may necessarily correspond with destruction of at least the removable pull-tab.

In accordance with other aspects of the present disclosure, the method of manufacture further comprises adhering a label to the stored value card at least partially covering the activation indicia. A side of the stored value card displaying the activation indicia may be adhered to the at least one inner surface of the first and second panels.

In accordance with other aspects of the present disclosure, the method of manufacture further comprises adhering a label to the stored value card at least partially covering the activation indicia. A first side of the stored value card may be adhered to an inner surface of the first panel and a second side of the stored value card may be adhered to an inner surface of the second panel.

In accordance with other aspects of the present disclosure, at least one of the first and second panels may include a plurality of slits. The plurality of slits may be located adjacent to at least a portion of the four sides of the chamber.

Numerous objects, features and advantages of the present invention will be readily apparent to those skilled in the art upon a review of the following description in conjunction with the accompanying drawings.

DETAILED DESCRIPTION

Figure 1:
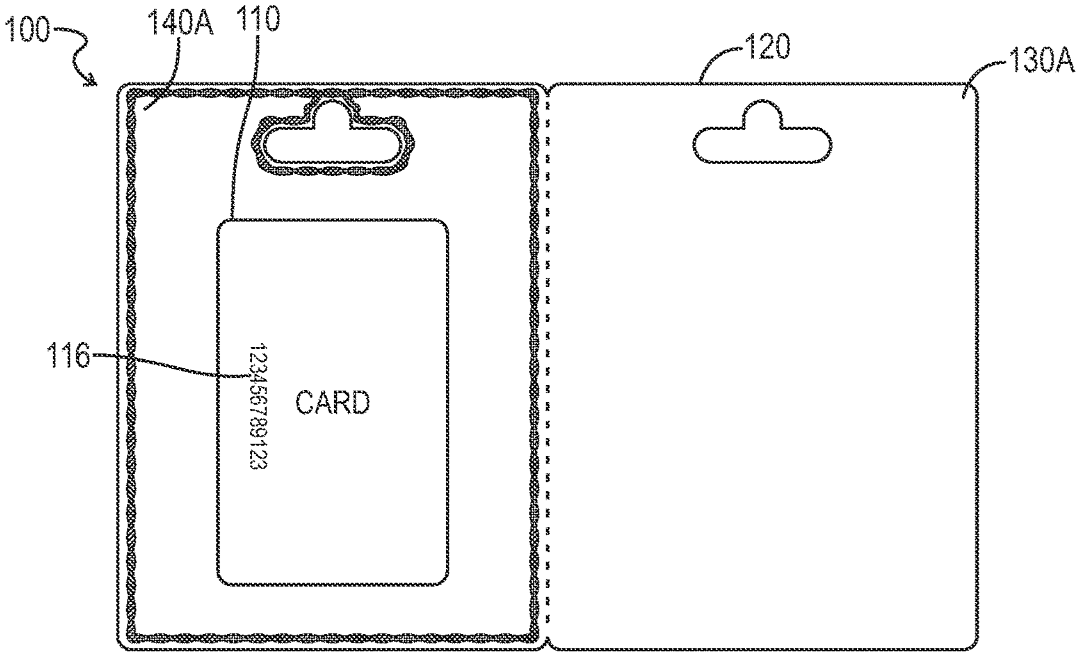
FIG. 1 is a front view of an exemplary embodiment of a stored value card and carrier system in accordance with the present disclosure wherein a carrier of the stored value card and carrier system is unsealed and a stored value card is adhered to the carrier.
Figure 2:
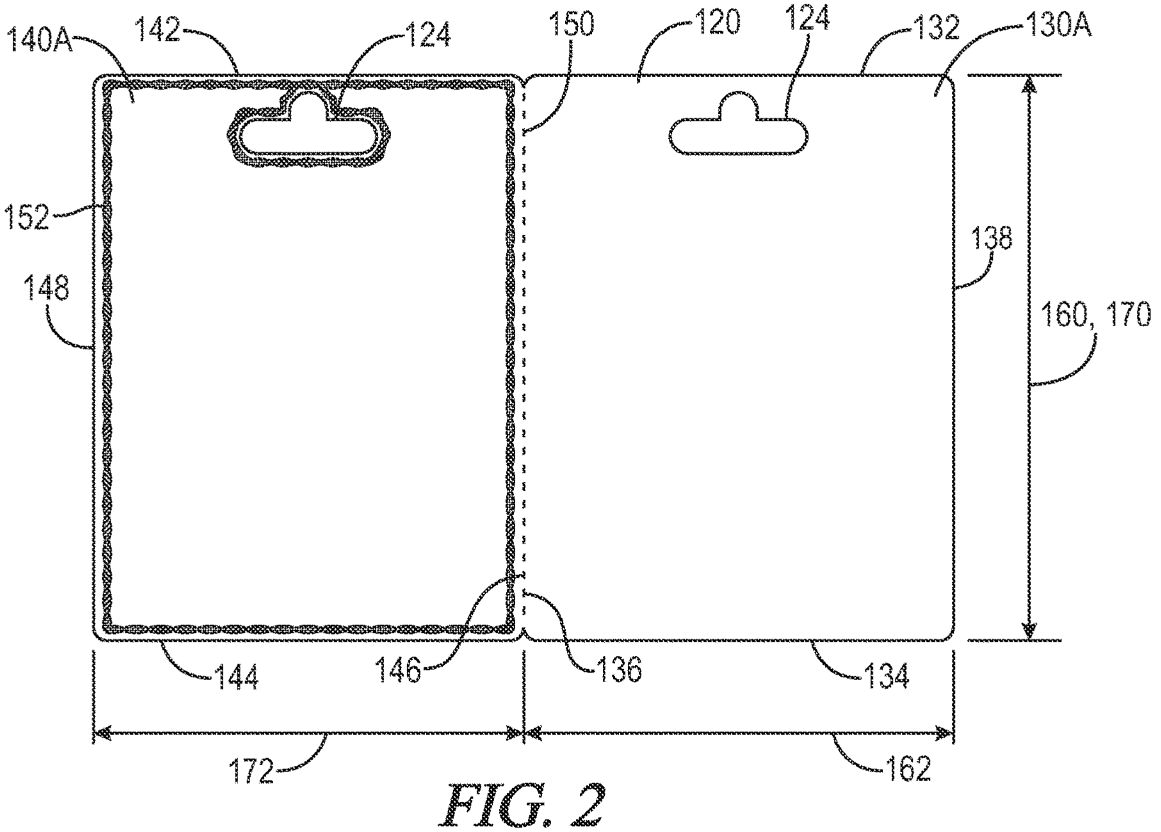
FIG. 2 is a front view of the carrier of the stored value card and carrier system of FIG. 1 wherein the carrier is unsealed.

Reference will now be made in detail to embodiments of the present disclosure, one or more drawings of which are set forth therein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words “connected,” “attached,” “joined,” “mounted,” “fastened,” and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof, and the like.

To the extent that the term “includes” or “including” is used in the specification or the claims, it is intended to be inclusive in a manner similar to the term “comprising” as that term is interpreted when employed as a transitional word in a claim. Furthermore, to the extent that the term “or” is employed (e.g., A or B) it is intended to mean “A or B or both.” When the applicants intend to indicate “only A or B but not both” then the term “only A or B but not both” will be employed. Thus, use of the term “or” herein is the inclusive, and not the exclusive use. See, Bryan A. Garner, A Dictionary of Modern Legal Usage 624 (2d. Ed. 1995). Also, to the extent that the terms “in” or “into” are used in the specification or the claims, it is intended to additionally mean “on” or “onto.” Furthermore, to the extent the term “connect” is used in the specification or claims, it is intended to mean not only “directly connected to,” but also “indirectly connected to” such as connected through another component or multiple components.

Referring now to the figures, and specifically FIGS. 1-5, a stored value card and carrier system is shown and generally referred to as number 100. The stored value card and carrier system 100 may include a stored value card 110 and a carrier 120. The stored value card 110 may also be referred to herein as a gift card 100. The carrier 120 may also be referred to herein as packaging 120.

The stored value card 110 may include a front side and a back side positioned opposite the front side. The stored value card 110 may include activation indicia 116 displayed thereon. The activation indicia 116 may include a barcode, magnetic stripe, unique code, or the like. The activation indicia 116 may be displayed on the front side and/or the back side. The stored value card 110 may be configured to store a monetary value thereon. The stored value card 110 may be configured in both an inactive and active state. When the stored value card 110 is in the inactive state, the stored value card may not have a monetary value stored or otherwise associated therewith. When the stored value card 110 is in the active state, the stored value card may have a monetary value stored or otherwise associated therewith.

In one exemplary use scenario, a consumer may present the stored value card 110 to a cashier associated with a retail store for activation. The cashier may be required to view or otherwise interact with the activation indicia 116 in order to activate the stored value card 110. In certain exemplary embodiments, the activation indicia 116 may be a barcode that the cashier scans via a reader device associated with a computer of the retail store. In other exemplary embodiments, the activation indicia 116 may be a magnetic stripe that the cashier “swipes” through a reader associated with a computer of the retail store. In other exemplary embodiments, the activation indicia 116 may be a unique code that the cashier manually inputs into a computer of the retail store. Thus, the stored value card 110 may not be activated (i.e., changed from an inactive state to an active state) without viewing or otherwise interacting with the activation indicia 116.

The carrier 120 may be configured to receive and support the stored value card 110 and may include a first panel 130 and a second panel 140. In certain optional embodiments, the first and second panels 130, 140 may be substantially similar in shape and size. However, it is within the spirit and scope of the present disclosure for the first and second panels 130, 140 to have differing shapes and sizes. In certain exemplary embodiments, such as the embodiments shown herein, each of the first and second panels 130, 140 may be generally rectangular. Generally rectangular may refer to a rectangular outline that may have slight irregularities or non-linearities such as, for example, rounded corners.

The first panel 130 may define a top edge 132, a bottom edge 134, a first side 136, and a second side 138. The first panel 130 may be referred to as having an inner surface 130A and an outer surface 130B. The second panel 140 may define a top edge 142, a bottom edge 144, a first side 146, and a second side 148. The second panel 140 may be referred to as having an inner surface 140A and an outer surface 140B. The first panel 130 and second panel 140 may be formed in a single sheet of material. In certain exemplary embodiments, the first side 136 of the first panel 130 and the first side 146 of the second panel 140 may be defined along a common fold line 150 formed in the single sheet of material. The common fold line 150 may be scored for ease of folding. In other optional embodiments, the second side 138 of the first panel 130 and the second side 148 of the second panel 140 may be defined along a common fold line 150 formed in the single sheet of material. In other optional embodiments, the first panel 130 and second panel 140 may be formed from two separate sheets of material. Each of the first and second panels 130, 140 may include a hang hook 124 defined therein configured to receive a retail store’s display hook therethrough.

The first panel 130 may include a height 160 extending from the bottom edge 134 to the top edge 132 and a width 162 extending from the first side 136 to the second side 138. The second panel 140 may include a height 170 extending from the bottom edge 144 to the top edge 142 and a width 172 extending from the first side 146 to the second side 148. The height 160 of the first panel 130 may be greater than the width 162 of the first panel 130. The height 170 of the second panel 140 may be greater than the width 172 of the second panel 140. However, in other optional embodiments, the width 162, 172 of the first and second panels 130, 140 may be greater than the height 160, 170 of the first and second panels 130, 140, respectively.

Figure 3:
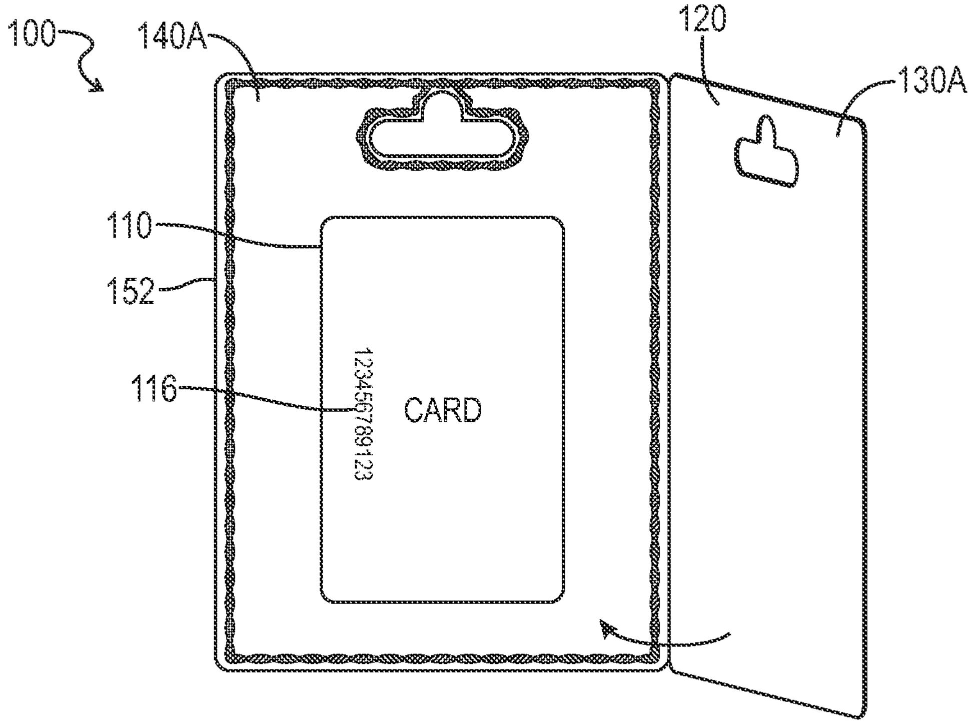
FIG. 3 is a front view of the stored value card and carrier system of FIG. 1 wherein the a first panel of the carrier is being folded toward a second panel of the carrier.
Figure 4:
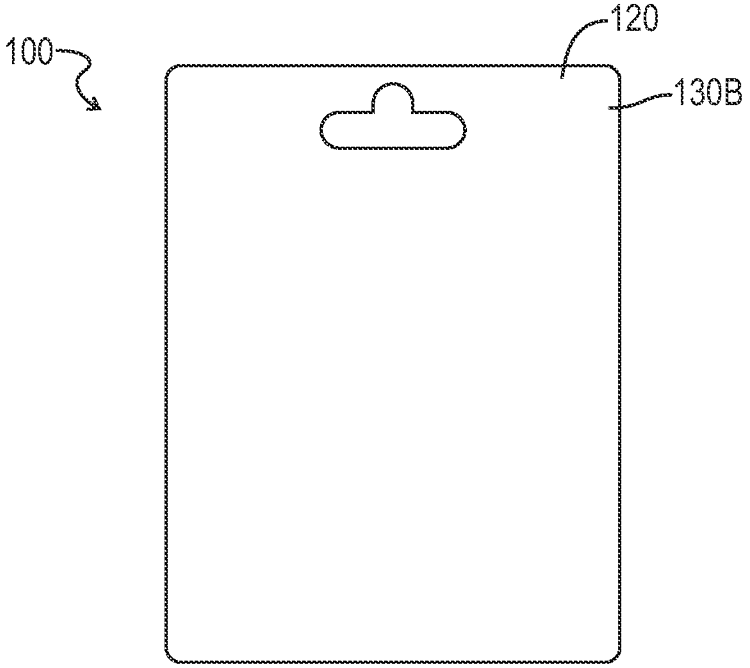
FIG. 4 is a front view of the stored value card and carrier system of FIG. 1 wherein the carrier is sealed.
Figure 5:
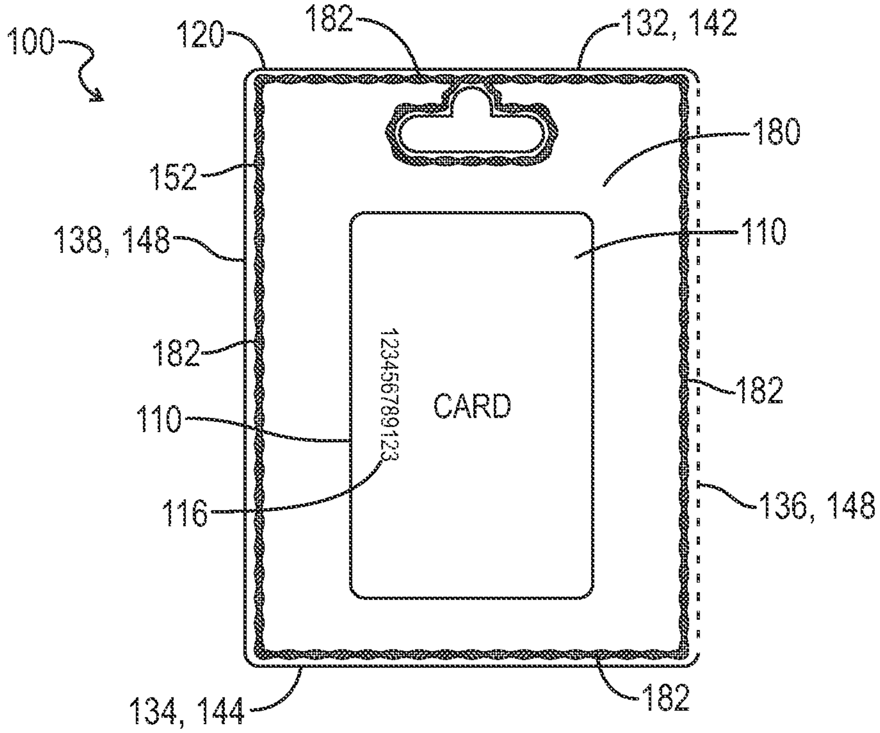
FIG. 5 is a front view of the stored value card and carrier system of FIG. 1 wherein the carrier is sealed and a first panel of the carrier is removed.

The first and second panels 130, 140 may be coupled together to define a chamber 180 therein having four (4) sides. The first panel 130 may be folded toward the second panel 140, as shown in FIG. 3 such that the first and second panels 130, 140 couple together to form a sealed carrier 120, as shown in FIG. 4. FIG. 5 depicts the stored value card and carrier system 100 wherein the carrier 120 is sealed, but the first panel 130 has been removed to expose the chamber 180. Each of the four (4) sides of the chamber 180 may be generally referred to by number 182. Each side 182 of the chamber 180 may be formed where the first and second panels 130, 140 are coupled together. Thus, the top edges 132, 142 may form a side 182, the bottom edges 134, 144 may form a side 182, the first sides 136, 146 may form a side 182, and the second sides 138, 148 may form a side 182. The chamber 180 may be sealed on each of the four (4) sides 182 such that egress to an interior of the chamber 180 is substantially prevented. Thus, each of the four (4) sides 182 may connect such that they form a continuous shape. "Continuous" as used herein may refer to embodiments wherein an adhesive 152 is intermittently used such that there are portions of the sides 182 of the chamber 180 wherein no adhesive 152 is present. Thus, the adhesive 152 may still form a continuous perimeter even when there are portions of the sides 182 of the chamber 180 wherein no adhesive 152 is present. Thus, the chamber 180 may be described as being "sealed" when there are portions of the sides 182 of the chamber 180 wherein no adhesive 152 is present.

Figure 11:
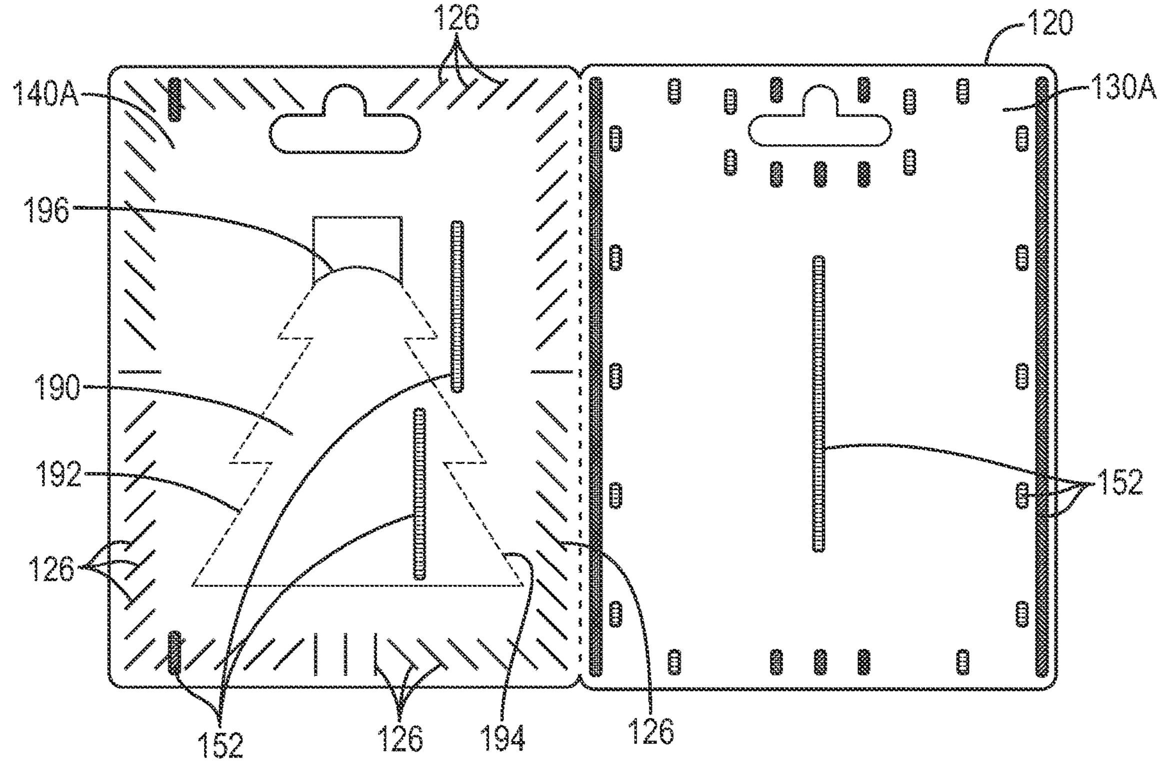
FIG. 11 is a front view of a carrier of an exemplary embodiment of a stored value card and carrier system in accordance with the present disclosure.
Figure 13:
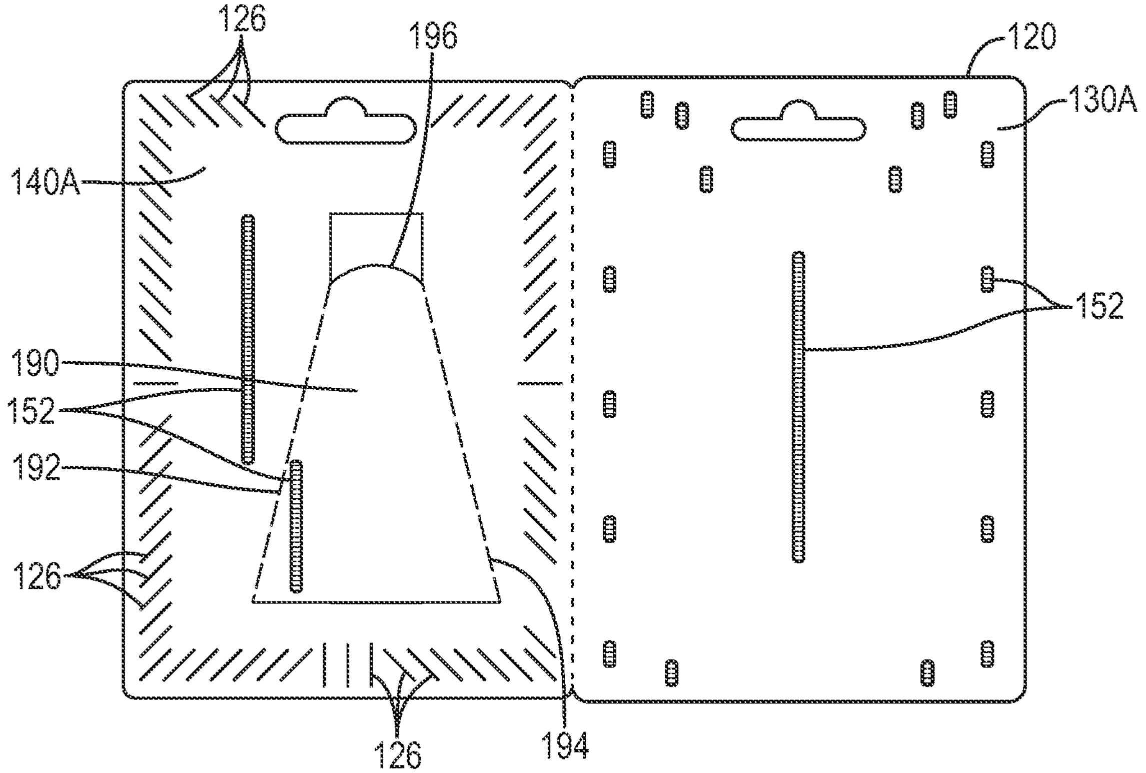
FIG. 13 is a front view of a carrier of an exemplary embodiment of a stored value card and carrier system in accordance with the present disclosure.
Figure 15:
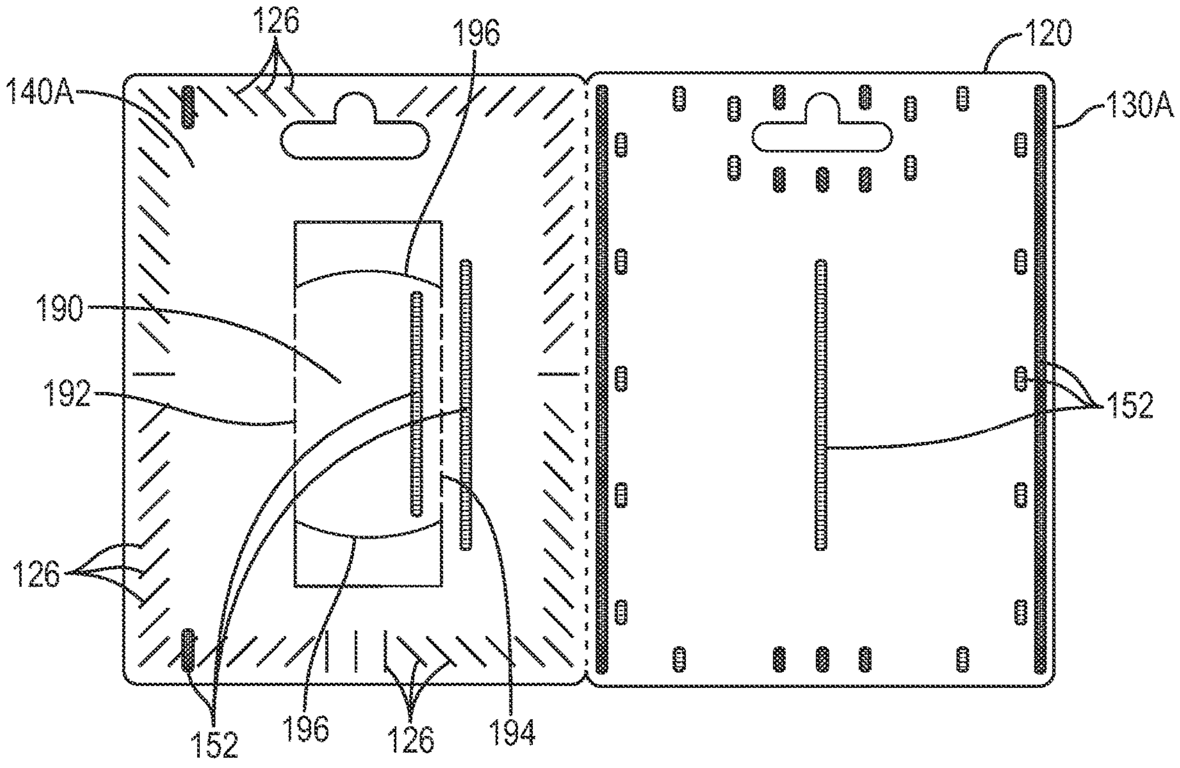
FIG. 15 is a front view of a carrier of an exemplary embodiment of a stored value card and carrier system in accordance with the present disclosure.

The adhesive 152 may be arranged along the four (4) sides 182 in a specific pattern. In the exemplary embodiments shown in FIGS. 11, 13, and 15, the adhesive 152 is arranged in a pattern wherein strips of adhesive 152 are arranged along a substantial portion of the first sides 136, 146 and second sides 138, 148 of the first and second panels 130, 140. Smaller strips of adhesive 152 may be arranged intermittently along the top edges 132, 142, and bottom edges 134, 144. In optional embodiments wherein the carrier 120 includes hang hook 124, adhesive 152 may be arranged around the hang hook 124 such that the adhesive 152 forms a substantially continuous perimeter.

The first and second panels 130, 140 may be coupled together via adhesive 152, fasteners, or the like. In certain optional embodiments, the carrier 120 may be configured such that the same adhesive 152, fasteners, or the like can't be reused to couple the first and second panels 130, 140 together once the coupling between the first and second panels 130, 140 has been broken. In other words, the chamber 180 is configured such that re-sealing the chamber 180 would be visually detectable to a consumer.

The stored value card and carrier system 100 may be configured such that the stored value card 110 may be situated within the chamber 180. The stored value card 110 may be adhered to at least one inner surface of the chamber 180 via the adhesive 152. The inner surfaces of the chamber 180 may include the inner surfaces 130A, 140A of the first and second panels 130, 140, respectively.

The adhesive 152 used to adhere the stored value card 110 to the first and/or second panels 130, 140 may be the same adhesive 152 used to couple the first and second panels 130, 140 together. The adhesive 152 may be an epoxy, polyurethane, polyimide, permanent hot glue, permanent cold glue, or the like. In certain optional embodiments, two or more types of adhesives 152 may be used to increase the security of the stored value card and carrier system 100.

In certain optional embodiments, only one of either the front side or the back side of the stored value card 110 may be adhered to an inner surface of the chamber 180. In other optional embodiments, both the front side and back side of the stored value card 110 may be adhered to inner surfaces of the chamber 180. For example, the front side of the stored value card 110 may be adhered to a first inner surface of the chamber 180 and the back side of the stored value card 110 may be adhered to a second inner surface of the chamber 180. Alternatively, the back side of the stored value card 110 may be adhered to the first inner surface of the chamber 180 and the front side of the stored value card 110 may be adhered to the second inner surface of the chamber 180. In certain optional embodiments, the side (i.e., front side or back side) of the stored value card 110 displaying the activation indicia 116 may be the side adhered to the at least one inner surface of the chamber 180. In other optional embodiments, the side (i.e., front side or back side) of the stored value card 110 that is not displaying the activation indicia 116 may be the side adhered to the at least one inner surface of the chamber 180. In other optional embodiments, both the front side and back side may be adhered to the inner surfaces of the chamber 180. It may be preferable in certain instances to adhere the side (i.e., front side or back side) of the stored value card 110 displaying the activation indicia 116 to the at least one inner surface of the chamber 180.

Figure 6:
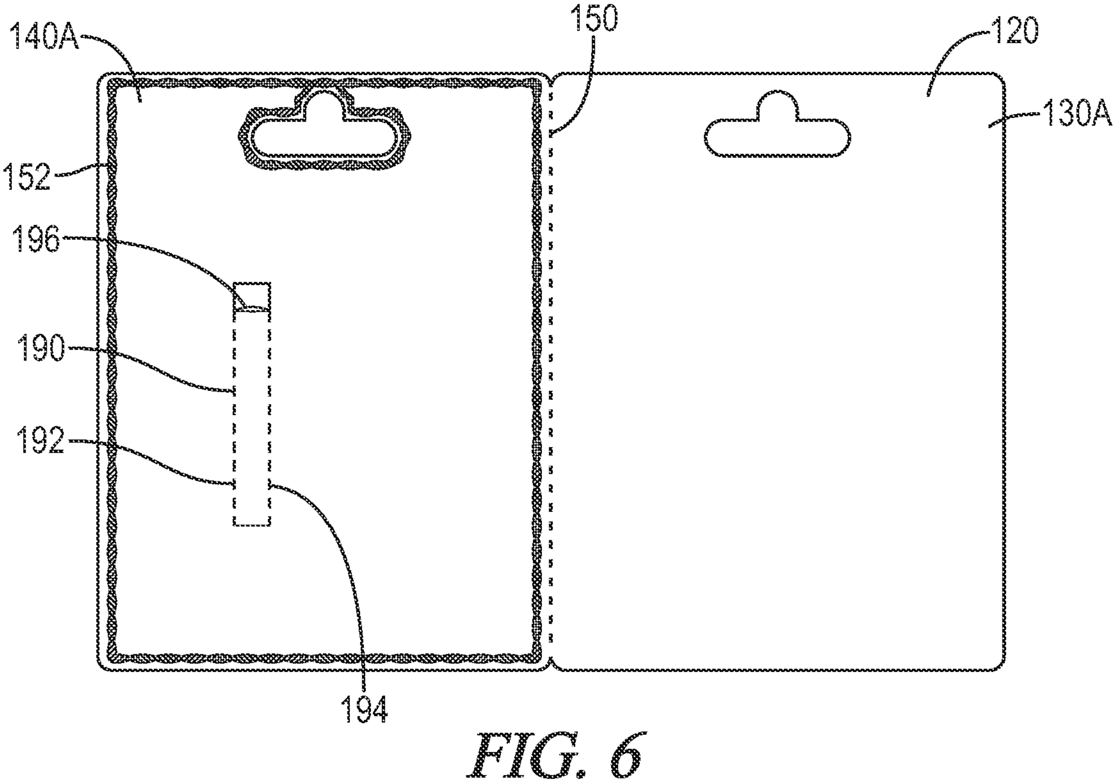
FIG. 6 is a front view of a carrier of an exemplary embodiment of a stored value card and carrier system in accordance with the present disclosure wherein a second panel of the carrier includes a pull-tab.
Figure 7:
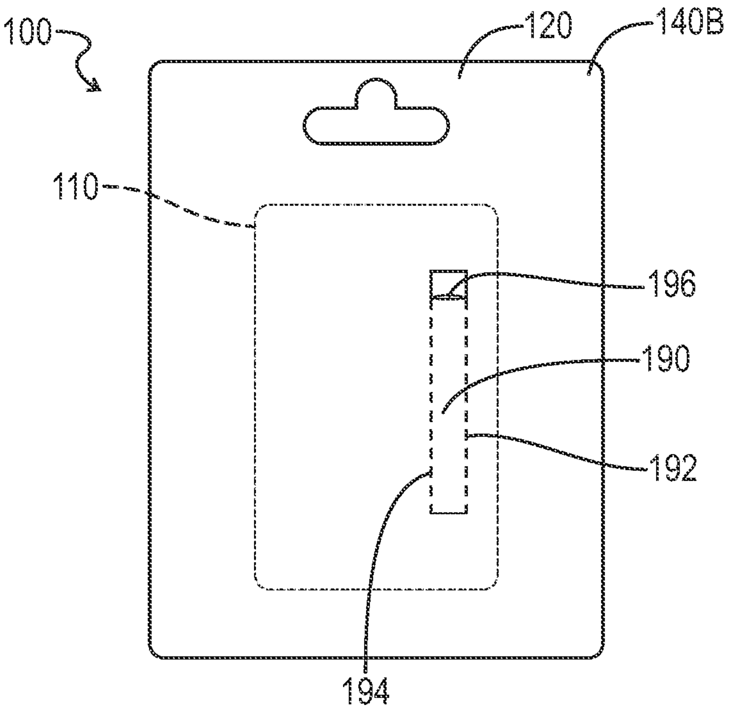
FIG. 7 is a back view of the stored value card and carrier system of FIG. 6 wherein a stored value card is positioned with the carrier and the second panel of the carrier includes the pull-tab.
Figure 8:
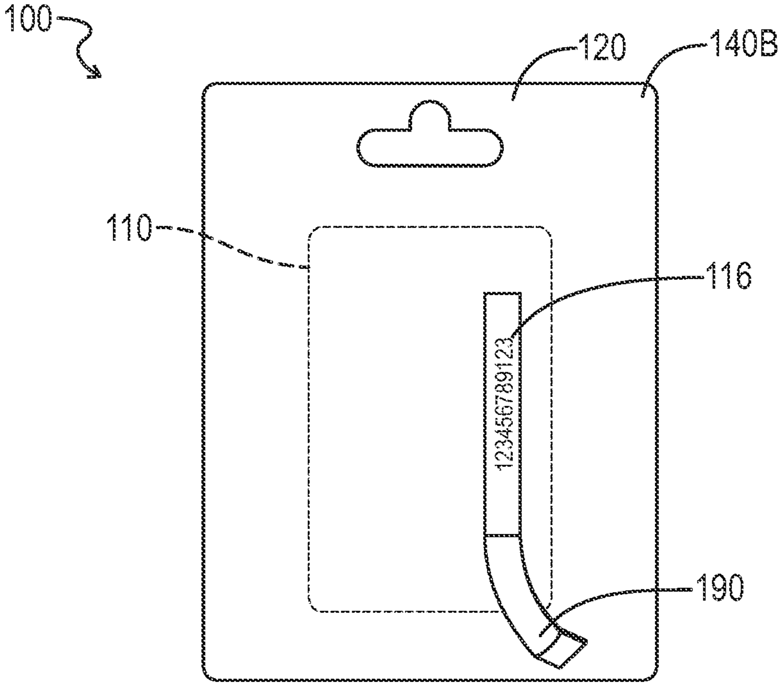
FIG. 8 is a back view of the stored value card and carrier system of FIG. 6 wherein a stored value card is positioned with the carrier and the pull-tab is partially removed from the second panel of the carrier.

Referring now to FIGS. 6-8, the carrier 120 may include a removable pull-tab 190. While the exemplary embodiment of the pull-tab 190 is rectangular, it is within the spirit and scope of the present disclosure for the pull-tab to be other shapes and/or sizes. The removable pull-tab 190 may be defined in either the first or second panels 130, 140. In certain optional embodiments, as shown in FIGS. 6-8, the removable pull-tab 190 is defined in the second panel 140. FIG. 6 shows the inner surface 140A of the second panel 140 having pull-tab 190 defined therein wherein the carrier 120 has not been sealed. FIG. 7 shows the outer surface 140B of the second panel 140 having pull-tab 190 defined therein wherein the carrier 120 has been sealed. FIG. 8 shows the outer surface 140B of the second panel 140 wherein the pull-tab 190 has been partially separated from the second panel 140.

The removable pull-tab 190 may include a first perforated edge 192 and a second perforated edge 194. The first and second perforated edges 192, 194 may couple the removable pull-tab 190 to the remaining portions of the either first or second panels 130, 140. The removable pull-tab 190 may include a thumb notch 196 at an end configured to be engaged by a user. The removable pull-tab 190 may be configured such that when the removable pull-tab is at least partially separated from the corresponding panel 130, 140 along the first and second perforated edges 192, 194, the removable pull-tab 190 may not be recoupled to the either first or second panel 130, 140. Thus, if a fraudster were to remove, even partially, the pull-tab 190, the fraudster could not recouple the pull-tab 190 to the corresponding panel 130, 140. Attempts to recouple the pull-tab 190 would result in visual clues that may preferably alert the consumer that tampering has taken place.

In certain optional embodiments, the removable pull-tab 190 may be positioned adjacent to the stored value card 110. The removable pull-tab 190 may at least partially cover the activation indicia 116 of the stored value card 110. The stored value card 110 may be adhered to the removable pull-tab 190. In certain optional embodiments, at least portions of the stored value card 110 surrounding the activation indicia 116 may be adhered to the removable pull-tab 190. Thus, the adhesive 152 may form a perimeter around the activation indicia 116 such that the activation indicia 116 is sealed on all sides against the removable pull-tab 190. In other optional embodiments, the adhesive 152 may be a single line of adhesive 152 aligned with the activation indicia 116 or adjacent thereto.

Figure 9:
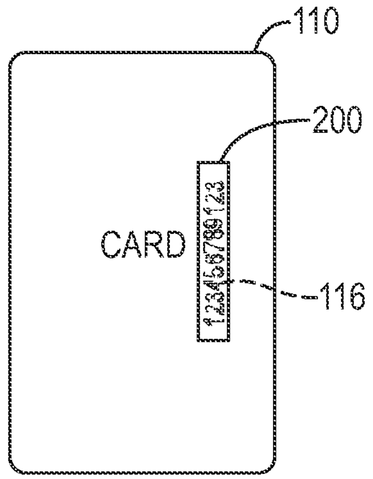
FIG. 9 is a front view of an exemplary embodiment of a stored value card in accordance with the present disclosure wherein a label is covering activation indicia of the stored value card.
Figure 10:
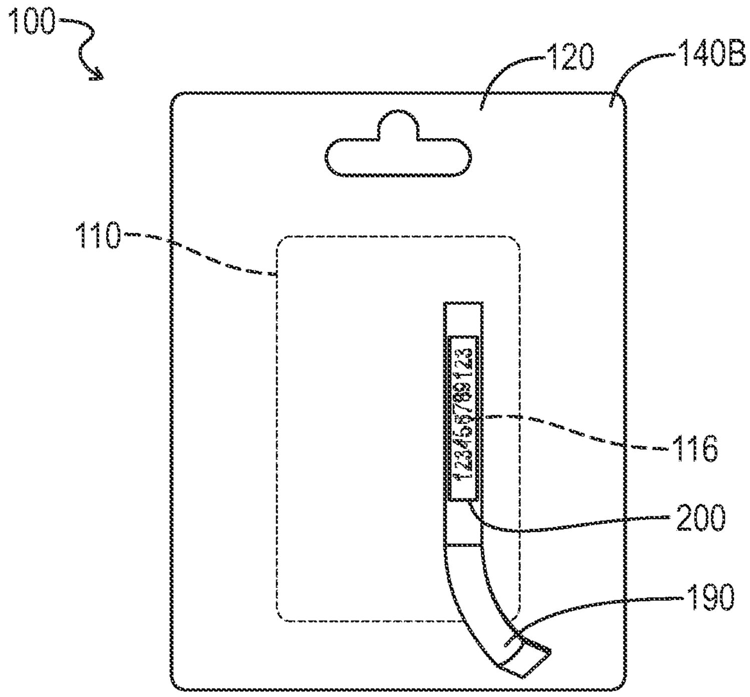
FIG. 10 is a back view of an exemplary embodiment of a stored value card and carrier system in accordance with the present disclosure wherein a pull-tab is partially removed from a second panel of a carrier to expose a label covering activation indicia of the stored value card.

Referring now to FIGS. 9 and 10, in certain optional embodiments, a label 200 may be adhered to the stored value card 110. The label 200 may at least partially cover the activation indicia 116 such that the activation indicia 116 can only be viewed by removal of the label 200. FIG. 9 shows the label 200 adhered to the stored value card 110. In optional embodiments wherein the side of the stored value card 110 displaying the activation indicia 116 is adhered to an inner surface of the chamber 180, the label 200 may be situated between the stored value card 110 and inner surface of the chamber 180. The adhesive 152 may be applied to the stored value card 110 adjacent to the label 200 but not on the label 200. Thus, two independent actions must be taken to view the activation indicia 116. First, a customer must separate the stored value card 110 from the chamber 180. Second, the customer must remove the label 200 that is covering the activation indicia 116. In other optional embodiments, such as the embodiment in FIG. 10, the label 200 may be adhered to the stored value card 110 and the card adhered to a panel 130, 140 having a pull-tab 190 defined therein. Thus, two independent actions must be taken to view the activation indicia 116. First, a customer must at least partially remove the pull-tab 190 to expose the label 200. Second, the customer must remove the label 200 to expose the activation indicia 116.

The stored value card and carrier system 100 may be configured such that accessing of the activation indicia 116 may necessarily correspond with destruction of at least one of the first and second panels 130, 140. In order for a fraudster to access the stored value card 110, the fraudster must destroy the first panel 130, second panel 140, and/or the pull-tab 190. This destruction may preferably serve as a visual indication that the stored value card and carrier system 100 has been tampered with.

In certain optional embodiments, as shown in FIGS. 11-16, the first and/or second panels 130, 140 may include a plurality of slits 126 defined therein. Each of the plurality of slits 126 may be cut entirely though the corresponding panel 130, 140, or alternatively may be scored into the corresponding panel 130, 140. The plurality of slits 126 may be located adjacent to at least a portion of the four (4) sides 182 of the chamber 180. In certain optional embodiments, the plurality of slits 126 may create a substantially continuous perimeter around the card mounting zone 184 and stored value card 110 mounted in the chamber 180. Adhesive 152 may be applied to the portions of the first and/or second panels 130, 140 wherein the plurality of slits 126 are located. Thus, when the first panel 130 is separated from the second panel 140, tears may occur in the first and/or second panels 130, 140 adjacent to each of the plurality of slits 126. Thus, for a fraudster to access the stored value card 110, the fraudster may necessarily have to, at least partially, destroy first panel 130 and/or the second panel 140. The destruction (e.g., tears adjacent to the plurality of slits 126) of at least one of the first and second panels 130, 140 may serve as a visual indication that the stored value card 110 has been tampered with.

In certain optional embodiments having a pull-tab 190, accessing of the activation indicia 116 of the stored value card 110 may necessarily correspond with destruction of at least the removable pull-tab 190. The pull-tab 190 may separate from the panel 130, 140 along the perforated edges 192, 194 as shown in FIGS. 8 and 10. Once the connection between the pull-tab 190 and panel 130, 140 is broken, reconnection is not possible. While a fraudster may attempt to use an adhesive or tape to reconnect the pull-tab 190, the use of such adhesive or tape would be apparent to a consumer and indicate tampering.

Figure 12:
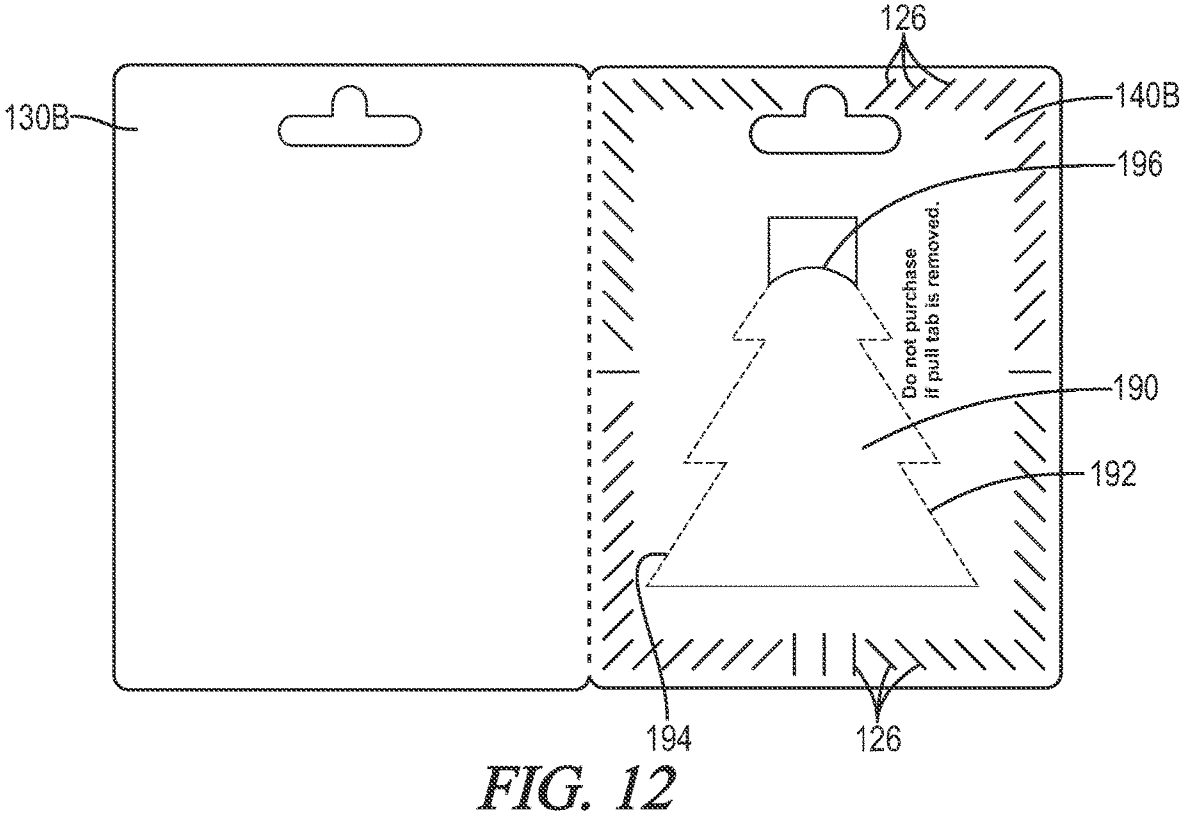
FIG. 12 is a back view of the carrier of the stored value card and carrier system of FIG. 11.
Figure 14:
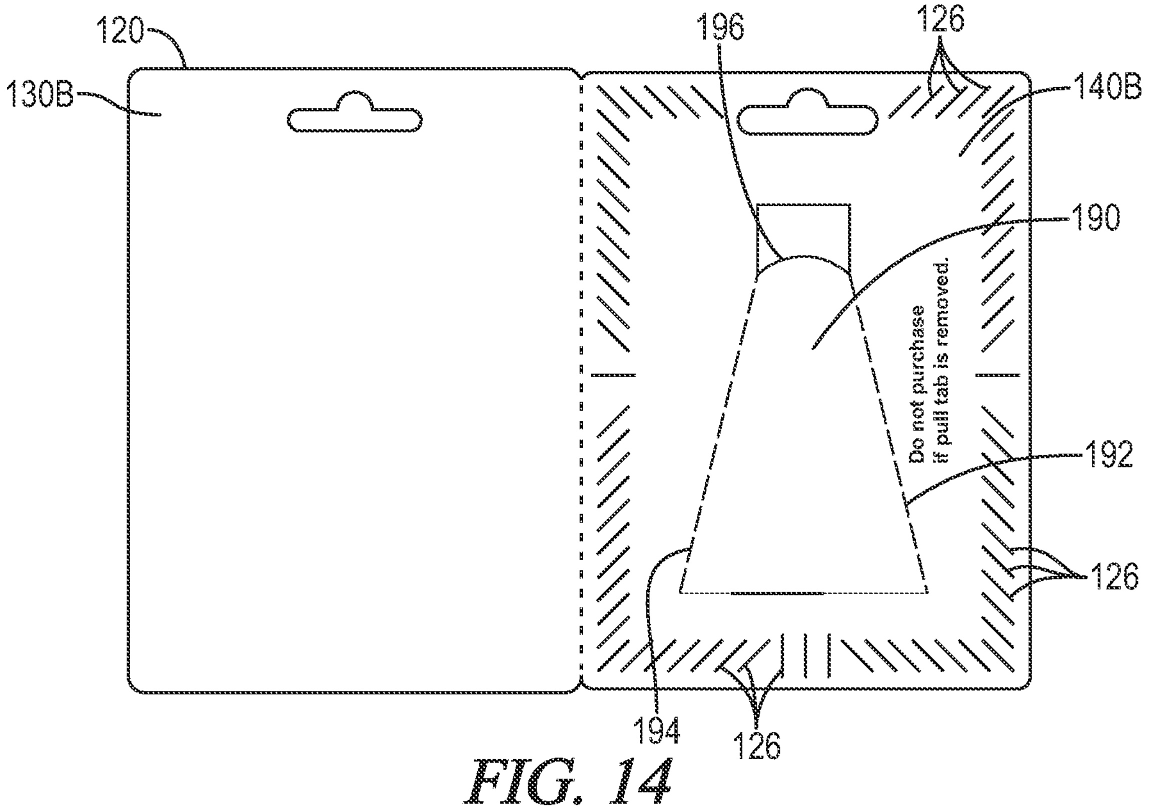
FIG. 14 is a back view of the carrier of the stored value card and carrier system of FIG. 13.
Figure 16:
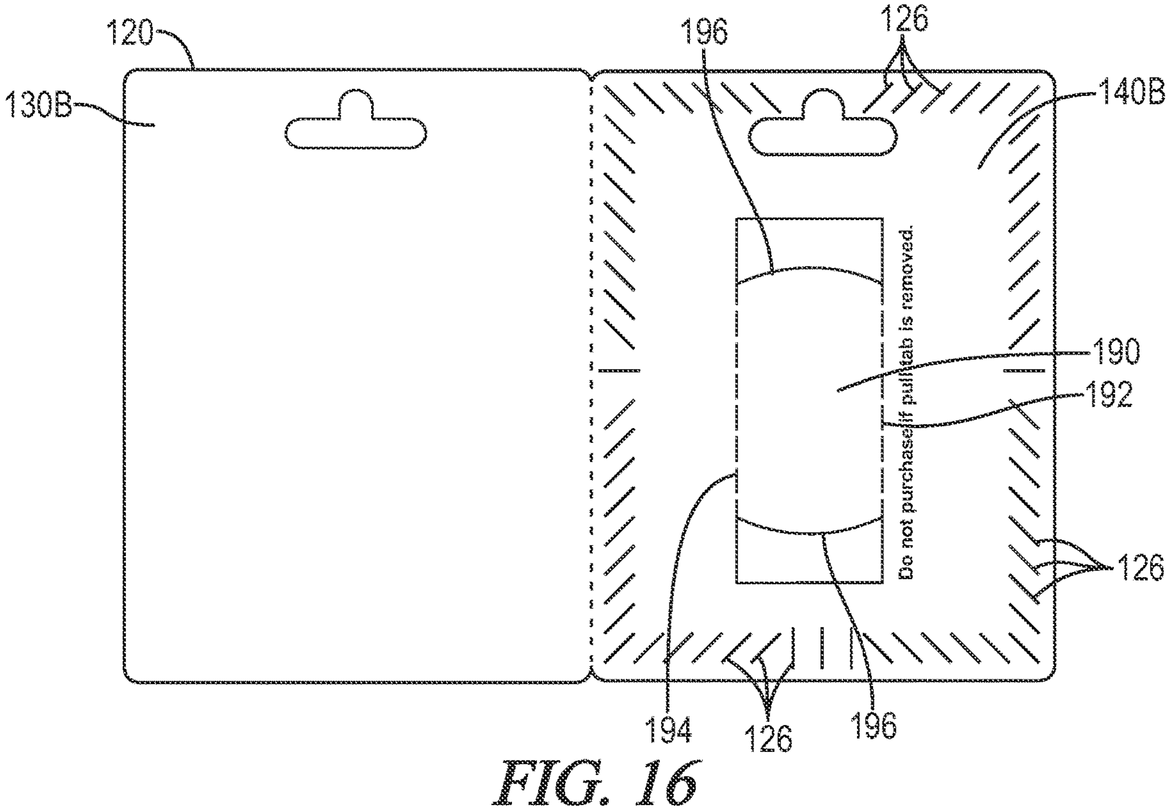
FIG. 16 is a back view of the carrier of the stored value card and carrier system of FIG. 15.

Various features discussed herein may be combined as desired in a single stored value card and carrier system 100. FIGS. 11-16 show several exemplary embodiments of the stored value card and carrier system 100. In each of the stored value card and carrier systems 100 of FIGS. 11-16, strips of adhesive 152 are arranged along a substantial portion of the first sides 136, 146 and second sides 138, 148 of the first and second panels 130, 140. Smaller strips of adhesive 152 are arranged intermittently along the top edges 132, 142 and bottom edges 134, 144. Adhesive 152 is arranged around the hang hook 124 such that the adhesive 152 forms a substantially continuous perimeter. As shown, a plurality of types of adhesive 152 are patterned together. Each of the optional embodiments includes the plurality of slits 126. The plurality of slits 126 creates a substantially continuous perimeter around the card mounting zone 184 and stored value card 110 mounted in the chamber 180. The adhesive 152 is positioned such that it contacts the plurality of slits 126. Further, each of the optional embodiments of FIGS. 11-16 further includes pull-tab 190 defined in the second panel 140. Adhesive 152 is positioned such that the stored value card 110 is adhered at least partially to the pull-tab 190. As shown in FIGS. 12, 14, and 16, the outer surface 140B of the second panel 140 may include a written instruction/warning to the consumer. In the illustrated optional embodiments, the written instruction/warning reads "Do not purchase if pull tab is removed."

Another aspect in accordance with this disclosure is a method of manufacturing the stored value card and carrier system 100. The method may include situating the stored value card 110 between the first and second panels 130, 140 and adhering the stored value card 110 to at least one inner surface of the first and second panels 130, 140, as shown in FIG. 1. The stored value card 110 may be adhered to a single desired panel 130, 140 prior to the remaining panel 130, 140 being situated adjacent and/or adhered to the stored value card 110. Adhesive 152 may be applied to the panels 130, 140 and/or the stored value card 110.

In certain optional embodiments wherein only a single side of the stored value card is adhered to an inner surface of the chamber 180, the side displaying the activation indicia 116 may be adhered, or alternatively the opposite side may be adhered. In certain optional embodiments, the front side of the stored value card 110 may be adhered to the inner surface of the first panel 130 and the back side of the stored value card 110 may be adhered to the inner surface of the second panel 140. In other optional embodiments, the front side of the stored value card 110 may be adhered to the inner surface of the second panel 140 and the back side of the stored value card 110 may be adhered to the inner surface of the first panel 130.

The method may include coupling the first and second panels 130, 140 together to define the chamber 180 having four sides 182, as shown in FIGS. 3-5. Each side 182 of the chamber 180 may be formed where the first and second panels 130, 140 are coupled together. Thus, the top edges 132, 142 may form a side 182, the bottom edges 134, 144 may form a side 182, the first sides 136, 146 may form a side 182, and the second sides 138, 148 may form a side 182. The first and second panels 130, 140 may be coupled together via adhesive 152 or the like. The adhesive 152 may form a continuous perimeter surrounding the stored value card 110 such that the chamber 180 is sealed on all four sides 182 and egress to the interior of the chamber 180 is substantially prevented.

In certain optional embodiments, such as the embodiments shown in FIGS. 1-3 and 5-6, the adhesive 152 may be arranged in a continuous strip around the chamber 180 where the stored value card 110 is situated. In other optional embodiments, such as the embodiments shown in FIGS. 11, 13, and 15, the adhesive 152 may be arranged in a pattern wherein continuous strips of adhesive 152 are arranged along the top edges 132, 142 and bottom edges 134, 144 of the first and second panels 130, 140 and smaller sections of adhesive 152 may be arranged intermittently along the first and second sides 136, 138, 146, 148.

The method may further include defining a plurality of slits 126 in the first and/or second panels 130, 140. Each of the plurality of slits 126 may be cut entirely though the corresponding panel 130, 140, or alternatively may be scored into the corresponding panel 130, 140. The plurality of slits 126 may be located adjacent to at least a portion of the four sides 182 of the chamber 180. In certain optional embodiments, the plurality of slits 126 may create a substantially continuous perimeter around the card mounting zone 184 and stored value card 110 mounted in the chamber 180. Adhesive 152 may be applied to the portions of the first and/or second panels 130, 140 wherein the plurality of slits 126 are located.

The method may further comprise defining the removable pull-tab 190 in either the first or second panel 130, 140. The removeable pull-tab 190 may at least partially cover the activation indicia 116 of the stored value card 110. The method may further comprise adhering the stored value card 110 to the removable pull-tab 190. At least a portion of the stored value card 110 surrounding the activation indicia 116 may be adhered to the removable pull-tab 190. Thus, the adhesive 152 may form a perimeter surrounding the activation indicia 116. The removable pull-tab 190 may include first and second perforated edges 192, 194 coupling the removable pull-tab 190 to the remaining portions of the either first or second panel 130, 140. Accessing of the activation indicia 116 of the stored value card 110 may necessarily correspond with destruction of at least the removable pull-tab 190.

Referring back to FIGS. 9 and 10, the method may further comprise adhering a label to the stored value card 110 at least partially covering the activation indicia 116. The side of the stored value card 110 displaying the activation indicia 116 may be adhered to the at least one inner surface of the first and second panels 130, 140. Alternatively, or in addition, the side of the stored value card 110 opposite the side displaying the activation indicia 116 may be adhered to the at least one inner surface of the first and second panels 130, 140.

It is within the scope of the present disclosure for the various security elements discussed herein to be combined as desired. For example, certain exemplary embodiments of the stored value card and carrier system 100 may include the plurality of slits 126, the pull-tab 190, and/or the label 200.

Thus, one exemplary advantage of the present disclosure may be that a customer is able to identify when the stored value card and carrier system 100 has been tampered with. In the embodiments discussed herein, the activation indicia 116 is not viewable without destroying at least one element of the stored value card and carrier system 100. The at least one element may include the first panel 130, second panel 140, pull-tab 190, label 200, or any other portion of the stored value card and carrier system 100. Another exemplary advantage of the present disclosure may be that a fraudster cannot re-assemble the stored value card and carrier system 100 without it being visually detectable that the stored value card and carrier system 100 has been tempered with. Moreover, the cashier of a retail store may further detect when the stored value card and carrier system 100 has been tampered with.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A stored value card and carrier system, comprising:
  - a carrier including first and second panels, the first and second panels coupled together to define a chamber therein having four sides, the chamber being sealed on each of the four sides such that egress to an interior of the chamber is substantially prevented; and
  - a stored value card having one or more activation indicia displayed thereon, the stored value card situated within the chamber and adhered to at least one inner surface of the chamber,
  - wherein the carrier includes a removable pull-tab defined in either the first or second panel, the removable pull-tab at least partially covering the one or more activation indicia of the stored value card, the stored value card directly adhered to the removable pull-tab;
  - wherein accessing of the one or more activation indicia of the stored value card necessarily corresponds with destruction of at least one of the first and second panels.

2. The stored value card and carrier system of claim 1, wherein:
  - a first side of the stored value card is adhered to a first inner surface of the chamber and a second side of the stored value card is adhered to a second inner surface of the chamber.

3. The stored value card and carrier system of claim 1, wherein:
  - the one or more activation indicia are displayed on a first side of the stored value card and the first side of the stored value card is adhered to the at least one inner surface of the chamber.

4. The stored value card and carrier system of claim 1, wherein:
  - the one or more activation indicia are displayed on a first side of the stored value card and a second side of the stored value card is adhered to the at least one inner surface of the chamber, the second side of the stored value card being opposite the first side.

5. The stored value card and carrier system of claim 1, wherein:
  - at least portions of the stored value card surrounding the one or more activation indicia are directly adhered to the removable pull-tab.

6. The stored value card and carrier system of claim 1, wherein:
  - the removable pull-tab includes first and second perforated edges coupling the removable pull-tab to the remaining portions of the either first or second panel, wherein accessing of the one or more activation indicia of the stored value card necessarily corresponds with destruction of at least the removable pull-tab.

7. The stored value card and carrier system of claim 1, further comprising:
  - a label adhered to the stored value card at least partially covering the one or more activation indicia, wherein a side of the stored value card displaying the one or more activation indicia is adhered to the at least one inner surface of the chamber.

8. The stored value card and carrier system of claim 1, further comprising:

a label adhered to the stored value card at least partially covering the one or more activation indicia, wherein a first side of the stored value card is adhered to a first inner surface of the chamber and a second side of the stored value card is adhered to a second inner surface of the chamber.

9. The stored value card and carrier system of claim 1, wherein:

at least one of the first and second panels includes a plurality of slits, the plurality of slits located adjacent to at least a portion of the four sides of the chamber.

10. A method of manufacturing a stored value card and carrier system, comprising:

situating a stored value card having one or more activation indicia between first and second panels of a carrier;

adhering the stored value card to at least one inner surface of the first and second panels;

defining a removeable pull-tab in either the first or second panel, the removable pull-tab at least partially covering the one or more activation indicia of the stored value card;

adhering the stored value card directly to the removable pull-tab; and coupling the first and second panels together to define a chamber having four sides, the chamber being sealed on each of the four sides such that egress to an interior of the chamber is substantially prevented;

wherein when the stored value card is situated within the chamber, accessing of the one or more activation indicia of the stored value card necessarily corresponds with destruction of at least one of the first and second panels.

11. The method of claim 10, wherein:

adhering the stored value card to at least one inner surface of the first and second panels includes adhering a first side of the stored value card to an inner surface of the first panel and a second side of the stored value card to an inner surface of the second panel.

12. The method of claim 10, wherein:

the one or more activation indicia are displayed on a first side of the stored value card; and adhering the stored value card to at least one inner surface of the first and second panels includes adhering the first side of the stored value card to at least one inner surface of the first and second panels.

13. The method of claim 10, wherein:

the one or more activation indicia are displayed on a first side of the stored value card; and adhering the stored value card to at least one inner surface of the first and second panels includes adhering a second side of the stored value card to at least one inner surface of the first and second panels, the second side of the stored value card being opposite the first side.

14. The method of claim 10, wherein:

adhering the stored value card to the removable pull-tab includes directly adhering at least a portion of the stored value card surrounding the one or more activation indicia to the removable pull-tab.

15. The method of claim 10, wherein:

the removable pull-tab includes first and second perforated edges coupling the removable pull-tab to the remaining portions of the either first or second panel, wherein accessing of the one or more activation indicia of the stored value card necessarily corresponds with destruction of at least the removable pull-tab.

16. The method of claim 10, further comprising:

adhering a label to the stored value card at least partially covering the one or more activation indicia, wherein a side of the stored value card displaying the activation indicia is adhered to the at least one inner surface of the first and second panels.

17. The method of claim 10, further comprising:

adhering a label to the stored value card at least partially covering the one or more activation indicia, wherein a first side of the stored value card is adhered to an inner surface of the first panel and a second side of the stored value card is adhered to an inner surface of the second panel.

18. The method of claim 10, wherein:

at least one of the first and second panels includes a plurality of slits, the plurality of slits located adjacent to at least a portion of the four sides of the chamber.

* * * * *